Figure 1:
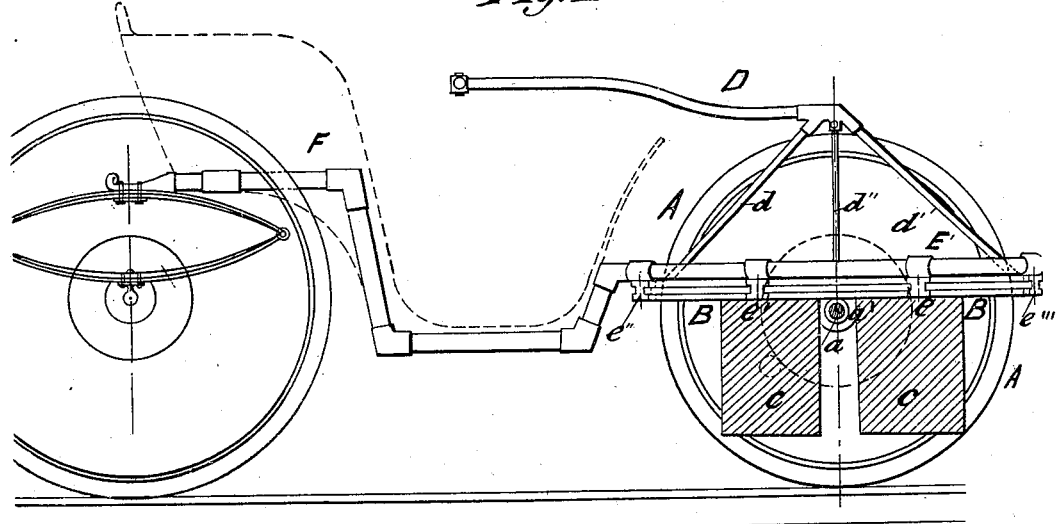
Figure 2:
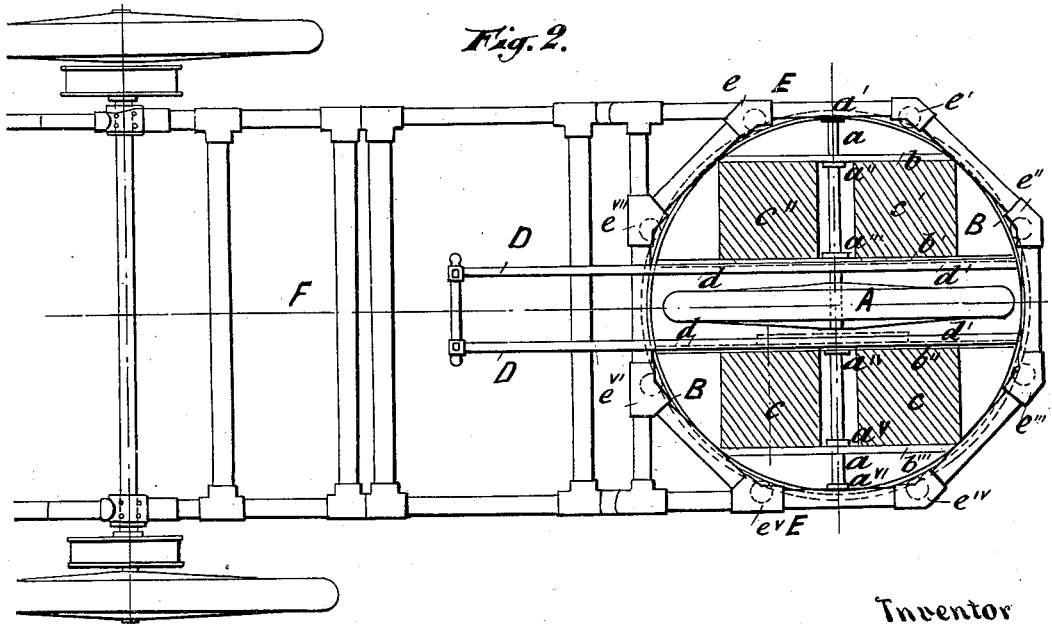

No. 648,070. J. GREFFE. Patented Apr. 24, 1900.
MOTOR CYCLE.
(Application filed Apr. 3, 1899.)

(No Model.)

Witnesses.
G. S. Noble.
J. Buehler.

Inventor
Joseph Greffe
by B. Singer
Att'y.

UNITED STATES PATENT OFFICE.

JOSEPH GREFFE, OF PARIS, FRANCE.

MOTOR-CYCLE.

SPECIFICATION forming part of Letters Patent No. 648,070, dated April 24, 1900.

Application filed April 3, 1899. Serial No. 711,540. (No model.)

*To all whom it may concern:*

Be it known that I, JOSEPH GREFFE, a citizen of the Republic of France, residing at Paris, France, have invented certain new and useful Improvements in Motor-Tricycles, of which the following is a specification.

My present invention relates to motor-tricycles having the motor at the front, the object being to provide a tricycle of this kind simple and substantial in construction, obviating all the different complications which the traction and steering of motor-vehicles present when the motor is at the front.

My tricycle involves the following principle: A vertical motor-wheel keyed upon a horizontal axle driven by a motor, the bearings of which are fitted below a horizontal ring carrying the motor and the appliances thereof in such a way that the wheel and ring thus secured together form a traction device which can be turned around about the vertical line passing through the point of contact of the wheel with the ground. In order to steer this traction device upon the road and maintain it in equilibrium no matter what direction is given to it, the steering or directing ring operated by a handle-bar rolls between horizontal rollers movable about their axis, all these axes being adjustable and arranged upon the horizontal branches of a frame constituting a prolongation of the shafts of the vehicle. The polygon of sustentation remaining in all positions an equilateral unchangeable triangle, the position of the center of gravity necessary for the equilibrium and the adhesive charge required to overcome the resistance of rolling motion is obtained by a judicious distribution of the motor and its accessories suspended under the directing-ring on each side of the motor-wheel. The front part of the vehicle thus constitutes an independent traction device capable of drawing, in the same manner as a horse, a two-wheeled carriage arranged at the back.

In the accompanying drawings, wherein like letters refer to like parts, Figure I represents a side elevation of the tricycle. Fig. II shows a plan view of same.

A is the vertical motor-wheel, the horizontal axle $a$ of which is journaled in bearings $a'$ $a''$ $a'''$, &c., fitted below the directing-ring.

B is the directing-ring, made of T-shaped iron and upon which are fitted the braces $b$ $b'$ $b''$, &c., serving to suspend the motor and its accessories.

C represents the electric, heat, or other motor actuating the axle $a$. $c$ $c'$ $c''$ represent the various accessories of said motor, such as hydrocarbon-reservoirs, water-tanks, gas-generators, storage batteries or the like.

D is the directing handle-bar, made integral with the directing-ring by means of forks and braces $d$ $d'$ $d''$.

E E' are the two branches of the frame, joined together in front of the vehicle and having a polygonal or circular form and carrying rollers $e$ $e'$ $e''$, &c.

F represents the carriage, suspended on springs fixed to the axle around which turn the two rear wheels.

The operation of the device is as follows: The motorman, seated in the carriage and having the different starting, speed-changing, and stopping devices in his reach, works the handle-bar to turn the front of the carriage in the required direction.

Having fully described my invention, what I claim, and desire to secure by Letters Patent, is—

In a motor-vehicle, the combination with the supporting-frame of the vehicle, of the steering-yoke B and means for guiding same, an axle mounted in said yoke and carrying a traction-wheel, a motor secured to and supported by said yoke and a plurality of grooved rollers mounted on said frame in frictional contact with said yoke and adapted to support the same, substantially as set forth.

In testimony whereof I have hereunto signed my name in presence of two subscribing witnesses.

JOSEPH GREFFE.

Witnesses:
 EDWARD P. MACLEAN,
 GEORGE E. LIGHT.